Sept. 9, 1941.  W. L. McGRATH  2,255,734

HUMIDITY RESPONSIVE DEVICE

Filed May 5, 1938

Inventor
William L. McGrath
By George H Fisher
Attorney

Patented Sept. 9, 1941

2,255,734

UNITED STATES PATENT OFFICE 2,255,734

HUMIDITY RESPONSIVE DEVICE

William L. McGrath, St. Paul, Minn., assignor to Minneapolis-Honeywell Regulator Company, Minneapolis, Minn., a corporation of Delaware Application May 5, 1938, Serial No. 206,174

3 Claims. (Cl. 73—335)

This invention relates to a control device which is responsive to the vapor pressure or the relative humidity of the atmosphere, and to a device for indicating the vapor pressure or relative humidity of the atmosphere.

One of the objects of the invention is the provision of a novel control device which responds rapidly to variations in the vapor pressure or relative humidity of the atmosphere and which will rapidly indicate changes in the vapor pressure or relative humidity of the atmosphere.

Other objects will become apparent upon a study of the specification, claims, and appended drawing in which:

Figures 1, 2, 3:
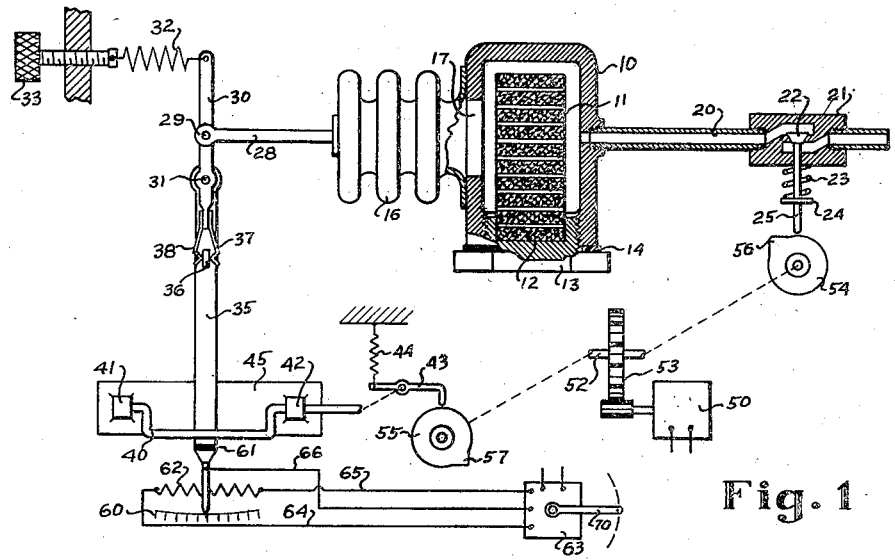
Figure 1 is a view partly in cross section of one form of device embodying my invention.
Figure 2 is a modification of the structure of Figure 1.
Figure 3 is a simplified form of indicating device embodying my invention.

Referring now to Figure 1 a casing or enclosure 10 is provided within which is suitably supported a body of dehydrating material 11, this material being shown as being supported within a recess 12 of a screw threaded cap 13 which forms the bottom wall of the enclosure 10. Any suitable dehydrating material may be used such for example as silica gel, anhydrous lithium chloride, or calcium chloride. Suitable sealing means 14 are provided between the enclosure 10 and the cap 13 to prevent the passage of air therebetween. Suitably secured to one wall of the enclosure 10 is an expansible member which is illustrated as being in the form of a bellows 16, the interior of this bellows being in communication with the interior of the enclosure 10 by means of the aperture 17 in the wall of the enclosure. The bellows 16 may be secured to the enclosure 10 in any suitable manner such as by welding, etc., it being understood that the connection between the bellows and the enclosure is air tight. The interior of enclosure 10 communicates with the atmosphere by means of the pipe 20 and the valve 21, this valve including a valve element 22 normally biased to closed position by means of a spring 23 interposed between the valve body and a suitable washer or like member 24 secured on the valve stem 25. It will thus be seen that normally the enclosure 10 is sealed from the atmosphere since the only means of communication therewith is closed by the valve 22.

Connected to the outer end of the bellows 16 is an arm 28 pivotally connected at 29 to a lever 30 which is in turn pivoted at 31 to any suitable supporting means. Connected to the upper end of the lever 30 is a tension spring 32 having its other end connected to a suitable adjusting screw 33 whereby the tension of the spring 32 may be varied. It will be seen that the spring 32 biases the bellows 16 to its expanded position. Also pivoted at 31 independently of the lever 30 is an arm 35 provided with a lug 36 received between spring members 37 and 38 which are rigidly connected to the lower end of the lever 30. These spring members and the lug form a strain release connection between the arm 35 and the lever 30 so that if the arm 35 is not restrained from movement, movement of the lever 30 about its pivot 31 will cause the arm 35 to move therewith. If, however, the arm 35 should be restrained from movement the lever 30 may still move with respect thereto, one of the spring members 37 or 38 being flexed and permitting this relative movement of the two members. It will now be seen that if the arm 35 is unrestrained from movement, expansion or contraction of the bellows 16 will cause a corresponding movement of the arm 35.

Means in the form of a U-shaped member 40 pivoted at 41 and 42 is provided for normally preventing movement of the arm 35. Rigid with one end of the member 40 is a lever 43 which is biased by means of a spring 44 in a direction to cause the member 40 to hold the arm 35 clamped against the plate 45 on which the member 40 is pivoted. If the right end of the lever 43 as viewed in Figure 1 is moved upwardly against the force of the spring 44, the member 40 is moved in a direction to release the lower end of the arm 35 so that it can move with the lever 30.

Means are provided for periodically and alternately opening the valve 22 and releasing the arm 35, this means being shown as including a constantly rotating motor 50 driving a shaft 52 through reduction gearing 53. Mounted on the shaft 52 and cams 54 and 55. The cam 54 includes a cam element 56 which once in every revolution of the cam engages the stem 25 of the valve 22 and causes this valve to move to open position. The cam 55 includes a cam element 57 which engages the right end of lever 43 once during every revolution of the cam which raises the member 40 upwardly out of engagement with the lower end of the arm 35. The cam elements 56 and 57 are spaced apart so that the valve 22 will first be opened and closed and the arm 35 will then be released for movement, these actions taking place periodically and alternately.

The opening of valve 22 allows air from the surrounding atmosphere to flow into the receptacle 10 through the dehydrating material 11 which is illustrated as being provided with a plurality of apertures therethrough, and also around this material and into the bellows 16. Assuming that the atmosphere contains a certain amount of moisture, this moisture will be removed by the dehydrating material 11 and if valve 22 is now closed, the removal of the moisture from the atmosphere results in lowering the pressure within the bellows 16 by an amount which is equal to the vapor pressure of the air which has been admitted to the enclosure 10. Because of the great affinity of the moisture for the dehydrating material 11 this moisture will be rapidly removed from the air and the pressure within the bellows 16 will rapidly fall, resulting in a contraction of the bellows 16 and movement of the lever 30 in a clockwise direction. Since the arm 35 is at this time prevented from movement by the member 40 the lever 30 will be moved with respect to the arm 35, this movement being permitted by the springs 37 and 38. Sometime after the valve 22 has been opened and closed the cam 55 will cause the release of arm 35 for a short time. This arm will now move under the action of the spring 38 until it is once more in alignment with the lever 30 and after this movement has taken place the cam 55 will release the lever 43 and the arm 35 will again be clamped in engagement with the plate 45 by the member 40. After a predetermined length of time, the valve 22 will again be opened, letting in more air into the enclosure 10. This valve will be opened long enough for the pressure within the enclosure 10 and the bellows 16 to become the same as the atmospheric pressure. When this happens the humidity of the air within the enclosure and the bellows will be the same as the humidity of the surrounding atmosphere because of the tendency of the moisture in the air to rapidly disperse and become equal both within and without the enclosure 10. If the humidity of the air has varied from the last time that the valve 22 was opened and closed the pressure within the bellows 16 will become different from the last operation of the valve since more or less moisture or vapor pressure will be removed by the dehydrating material 11 and this will be reflected by the arm 30 assuming a new position. Upon subsequent release of the arm 35 this will also assume a new position corresponding to the new position of the arm 30.

The lower end of the arm 35 may move over a suitable indicating scale 60 from which readings may be taken as to the actual vapor pressure of the air. Since the pressure acting on the exterior of the bellows 16 is the total pressure of the air and since the pressure within the bellows 16 is the total pressure of the air minus the vapor pressure of the air, the bellows 16 will move in accordance with variations in the vapor pressure and if the spring 32 is properly adjusted, readings may be taken directly from the scale 60 to give the actual vapor pressure of the air. The lower end of the arm 35 may be insulated by insulating material 61 and move over a resistance 62 which may form the control potentiometer of a proportioning motor 63. This motor may be of the type illustrated in Patent 2,028,110 issued to D. G. Taylor, January 14, 1936. Conductors 64 and 65 connect the outer ends of the resistance 62 to the outer terminals of the motor 63 and a conductor 66 connects the lower portion of arm 35 with the center terminal of the motor 63. An arm 70 is moved by the motor 63 in accordance with the movement of the lower end of arm 35 over the resistance 62 as will be understood from a study of the aforementioned Taylor patent. The arm 70 may be connected to any suitable apparatus for varying the relative humidity of the space in accordance with the movement of arm 35 so as to properly control the humidity within the space. Any other suitable mechanism may be operated by the arm 35, the particular mechanism being controlled by the arm 35 forming no part of the present invention.

The dehydrating material 11 is so supported within the enclosure 10 that it may be readily removed since after an extended period of use sufficient moisture will have been absorbed by this material that its replacement will be necessary. It will now be seen that a very simple and quickly responsive control and indicating device has been provided which responds to variations in the vapor pressure of the air and indicates the actual vapor pressure of the air. In the event that the vapor pressure of the air remains constant for an extended period of time the arm 35 will not move although the arm 30 will be moved each time the valve 22 is opened since the pressure within the bellows will be built up to the atmospheric pressure and will again drop to the pressure which is the atmospheric pressure less the vapor pressure. Since the arm 35 is not released for movement until the pressure within the bellows has returned to the atmospheric pressure less the vapor pressure, if the vapor pressure remains constant the arm 30 will be in the same position every time that the arm 35 is released for movement so that while the arm 30 will be constantly moved back and forth the arm 35 will move only when actual changes in the vapor pressure of the air occur.

Referring now to Figure 2 the apparatus disclosed is similar to Figure 1 except for the provision of means acting on the lever 30 so that this lever will move in accordance with the relative humidity in the space. The spring 32 is now replaced by a spring 75 which acts in the opposite direction from the spring 32, or in other words, tends to cause collapse of the bellows 16. This spring may be connected to a suitable adjusting screw 76 whereby its tension may be varied. A bellows 80 is suitably supported at one end and is provided with a pin or like member 81 rigidly connected thereto at the other end of the bellows and engaging the lever 30 below the pivot 31. This bellows is partially filled with water and it will be apparent that the air within the bellows 80 will be in a saturated condition. The pressure exerted by the bellows 80 against the lever 30, which pressure tends to expand the bellows 16, will be a pressure which is equal to the saturated vapor pressure of the air at the particular temperature of the air at any time. Acting against the exterior of both of the bellows 16 and 80 is atmospheric pressure and if the bellows are of equal size the effect of this atmospheric pressure on one bellows will be counteracted by the effect of the pressure on the other bellows. As in Figure 1 there will be a force tending to collapse the bellows 16 which is equal to the actual vapor pressure of the air. There will be a force tending to expand this bellows which is exerted by the bellows 80 and which is equal to the saturated vapor pressure of the air so that the arm 35 will actually be moved in accordance with variations in the actual vapor pressure of the air and the saturated vapor pressure of the air. If now the spring 75 is properly tensioned, this arm will move in accordance with variations in relative humidity of the air and this relative humidity can be directly read from the scale 85 over which the lower ends of the arm 35 moves. Suitable control apparatus may also be operated by the control element 35 as in Figure 1 but since this particular control apparatus forms no part of the present invention it is not being illustrated.

Referring now to Figure 3, a very simple arrangement for indicating the actual vapor pressure of the air is illustrated. An enclosure 90 has suitably supported therein as by means of a cap 91 threaded into the bottom of the enclosure, suitable dehydrating material 92. Air is periodically admitted into the enclosure by means of a hand operated valve 93 which is normally biased closed by means of a spring 94. Communicating with the interior of the enclosure is a Bourdon tube 96 which is connected by means of a rack 97 to an indicating arm 98 provided with a gear 99 which meshes with the rack 97. The action of this type of tube is well known and in response to an increase in the internal pressure within the tube, the tube tends to straighten out so that the rack 97 is moved toward the left causing movement of the indicating arm 98 to the left. Conversely upon a decrease in the pressure of the tube 96 the arm 98 will be moved toward the right. It will now be understood that every time air is admitted by means of the valve 93 into the enclosure 90 and the valve then closed, the pressure within the enclosure 90 and the Bourdon tube 96 will be reduced by the vapor pressure of the air since the vapor is removed by the dehydrating material 92 and since the pressure acting exteriorly on the tube 96 is the total pressure of the air, the indicating arm 98 will actually move in accordance with variations in the vapor pressure and the scale 100 over which the pointer 98 moves may be graduated so as to indicate directly the actual vapor pressure of the air.

It will now be seen that with the device of Figure 3, whenever it is desired to determine the vapor pressure of the air it is necessary only to manually operate the valve 93 and within a comparatively short period of time the pointer 98 will come to rest at a position to indicate the actual vapor pressure of the air.

Having described the preferred forms of my invention many modifications may become apparent to those skilled in the art and it should be understood that the invention is limited only by the scope of the appended claims.

I claim as my invention:

1. In a controller of the class described, an enclosure, an expansible member communicating with said enclosure, normally closed valve means for controlling the admission of air to said enclosure, a control element, means including a strain release device for operatively connecting said expansible member and said control element, means normally preventing said control element from moving in response to movement of said expansible member, means for supporting a dehydrating material in said enclosure, and means for alternately opening said valve means and releasing said control element.

2. In a controller of the class described, an enclosure for receiving a dehydrating material, means for periodically admitting air to said enclosure, an expansible member having communication with said enclosure, a control element operatively connected to said expansible member for movement therewith in response to variations in pressure within said enclosure, and means responsive to a saturated vapor pressure of the air biasing said expansible member to expanded position.

3. In a device of the character described, an enclosure for receiving a dehydrating material, said enclosure including an expansible portion, means for controllably admitting air to said enclosure, an element operatively connected to said expansible portion and movable thereby, and means responsive to a saturated vapor pressure of the air biasing said expansible member to expanded position.

WILLIAM L. McGRATH.